(12) United States Patent
Gorantla et al.

(10) Patent No.: US 8,947,827 B1
(45) Date of Patent: Feb. 3, 2015

(54) STITCHED POLE HAVING A TAPERED TIP

(71) Applicant: HGST Netherlands B.V., Amsterdam (NL)

(72) Inventors: Venkata R. K. Gorantla, Dublin, CA (US); Wen-Chien D. Hsiao, San Jose, CA (US); Yimin Hsu, Sunnyvale, CA (US); Terence T. L. Lam, Cupertino, CA (US); Yansheng Luo, Fremont, CA (US); Aron Pentek, San Jose, CA (US); Katalin Pentek, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/950,180

(22) Filed: Jul. 24, 2013

(51) Int. Cl.
*G11B 5/127* (2006.01)

(52) U.S. Cl.
USPC .................................... 360/125.06

(58) Field of Classification Search
USPC .................................... 360/125.06
See application file for complete search history.

(56) References Cited

U.S. PATENT DOCUMENTS

| | | | |
|---|---|---|---|
| 5,793,578 A | 8/1998 | Heim et al. | |
| 5,805,392 A | 9/1998 | Mallary et al. | |
| 6,122,144 A | 9/2000 | Chang et al. | |
| 6,282,056 B1 | 8/2001 | Feng et al. | |
| 6,612,017 B2 | 9/2003 | Santini | |
| 7,116,517 B1 * | 10/2006 | He et al. | 360/125.56 |
| 7,120,988 B2 * | 10/2006 | Le et al. | 29/603.07 |
| 7,130,153 B2 | 10/2006 | Shen et al. | |
| 7,133,253 B1 | 11/2006 | Seagle et al. | |
| 7,248,433 B1 | 7/2007 | Stoev et al. | |
| 7,283,327 B1 * | 10/2007 | Liu et al. | 360/123.17 |
| 8,379,347 B2 * | 2/2013 | Guan et al. | 360/125.15 |
| 8,446,689 B2 * | 5/2013 | Min et al. | 360/122 |
| 8,446,692 B2 * | 5/2013 | Zhou et al. | 360/125.31 |
| 8,542,464 B2 * | 9/2013 | Dovek et al. | 360/125.48 |
| 2011/0181979 A1 * | 7/2011 | Jin et al. | 360/59 |

OTHER PUBLICATIONS

Bai et al., "Stitched pole-tip design with enhanced head field for perpendicular recording," 2003 American Institute of Physics, Journal of Applied Physics, vol. 93, No. 10, May 15, 2003, pp. 6540-6542.

* cited by examiner

*Primary Examiner* — Mark Blouin
(74) *Attorney, Agent, or Firm* — Zilka-Kotab, PC

(57) ABSTRACT

In one general embodiment, a magnetic head includes a stitch pole; and a main pole formed adjacent the stitch pole, wherein an end region of the stitch pole closest to an air bearing surface of the head tapers towards the main pole. In another general embodiment, a magnetic head includes a stitch pole being a laminate of at least two magnetic layers separated by a nonmagnetic layer; and a main pole formed adjacent the stitch pole. An end region of the stitch pole closest to an air bearing surface of the head tapers towards the main pole. An average angle of the taper of the end region of the stitch pole is between about 20 and about 45 degrees. Such head may be implemented in a data storage system.

20 Claims, 7 Drawing Sheets

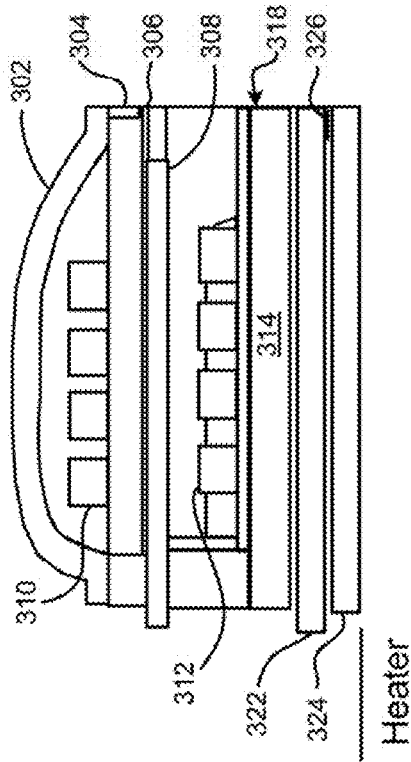
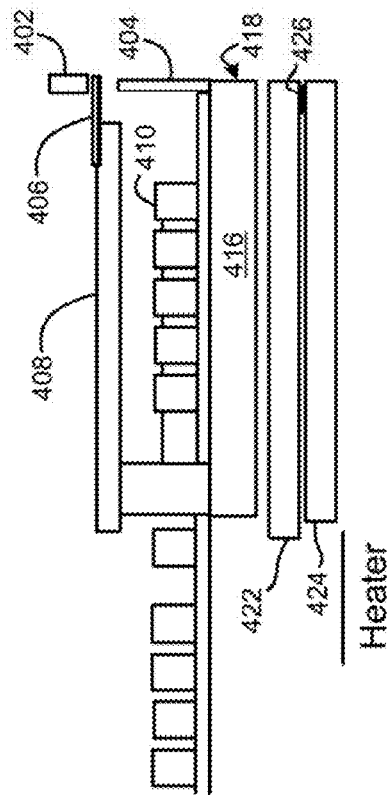
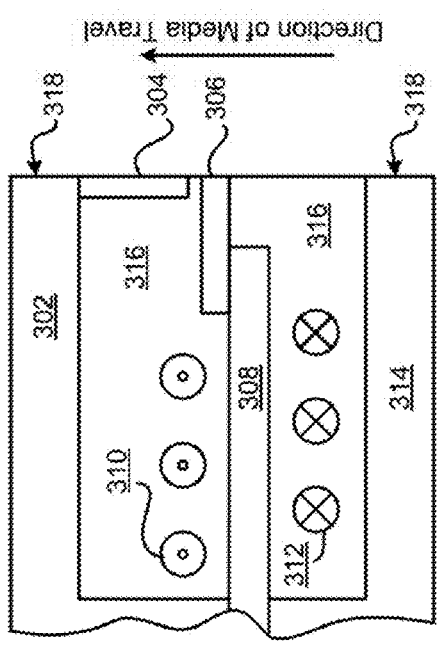
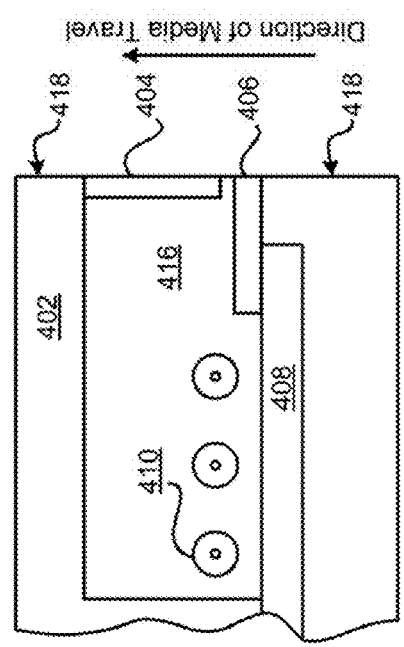

STITCHED POLE HAVING A TAPERED TIP

FIELD OF THE INVENTION

The present invention relates to data storage systems, and more particularly, this invention relates to magnetic heads having a tapered stitch pole for improved efficiency.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, it is desired that HDDs be able to store more information in their limited area and volume. A technical approach to this desire is to increase the capacity by increasing the recording density of the HDD. To achieve higher recording density, further miniaturization of recording bits is effective, which in turn typically requires the design of smaller and smaller components.

The further miniaturization of the various components, however, presents its own set of challenges and obstacles.

As the size of the various magnetic head components continue to become smaller, conventional products are forced to move their stitch poles farther away from the ABS to prevent leakage of flux while writing to a magnetic medium. However, this increased spacing between the stitch pole and the ABS results in weaker write fields, longer delays, and decreased efficiency of the head. Thus, it is desirable to produce a design which overcomes such disadvantages.

Various approaches described and/or suggested herein preferably include a magnetic head having a tapered stitch pole which improves efficiency of the head. The tapered stitch pole preferably allows for a reduction in the distance between the stitch pole and the ABS without causing flux leakage.

SUMMARY

A magnetic head according to one embodiment includes a stitch pole; and a main pole formed adjacent the stitch pole, wherein an end region of the stitch pole closest to an air bearing surface of the head tapers towards the main pole.

A magnetic head according to one embodiment includes a stitch pole being a laminate of at least two magnetic layers separated by a nonmagnetic layer; and a main pole formed adjacent the stitch pole. An end region of the stitch pole closest to an air bearing surface of the head tapers towards the main pole. An average angle of the taper of the end region of the stitch pole is between about 20 and about 45 degrees.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a magnetic head includes a stitch pole; and a main pole formed adjacent the stitch pole, wherein an end region of the stitch pole closest to an air bearing surface of the head tapers towards the main pole.

In another general embodiment, a magnetic head includes a stitch pole being a laminate of at least two magnetic layers separated by a nonmagnetic layer; and a main pole formed adjacent the stitch pole. An end region of the stitch pole closest to an air bearing surface of the head tapers towards the main pole. An average angle of the taper of the end region of the stitch pole is between about 20 and about 45 degrees.

Figure 1:
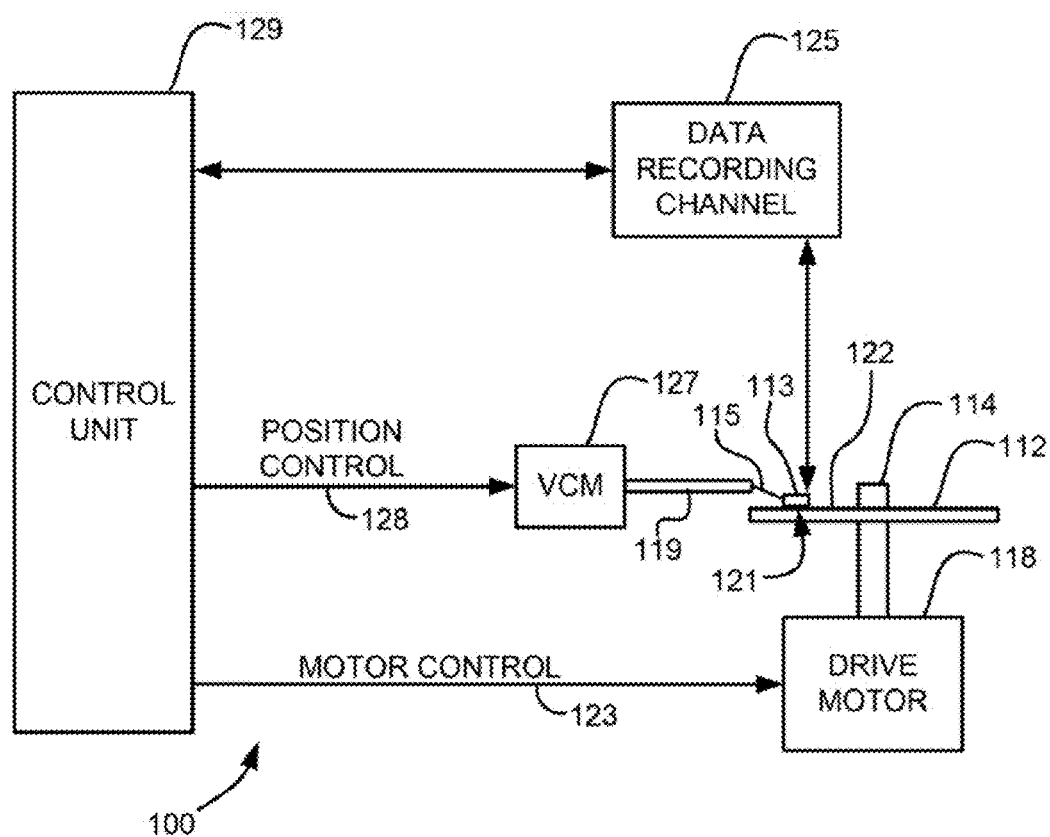
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic medium (e.g., magnetic disk) 112 is supported on a spindle 114 and rotated by a drive mechanism, which may include a disk drive motor 118. The magnetic recording on each disk is typically in the form of an annular pattern of concentric data tracks (not shown) on the disk 112. Thus, the disk drive motor 118 passes the magnetic disk 112 over the magnetic read/write portions 121, described immediately below.

At least one slider 113 is positioned near the disk 112, each slider 113 supporting one or more magnetic read/write portions 121, e.g., of a magnetic head according to any of the approaches described and/or suggested herein. As the disk rotates, slider 113 is moved radially in and out over disk surface 122 so that portions 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. In a preferred approach, the control unit 129 is electrically coupled (e.g., via wire, cable, line, etc.) to the one or more magnetic read/write portions 121, for controlling operation thereof. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write portions 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write portion includes a coil layer embedded in one or more insulation layers (insulation stack), the insulation stack being located between first and second pole piece layers. A gap is formed between the first and second pole piece layers by a gap layer at an air bearing surface (ABS) of the write portion. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figure 2A:
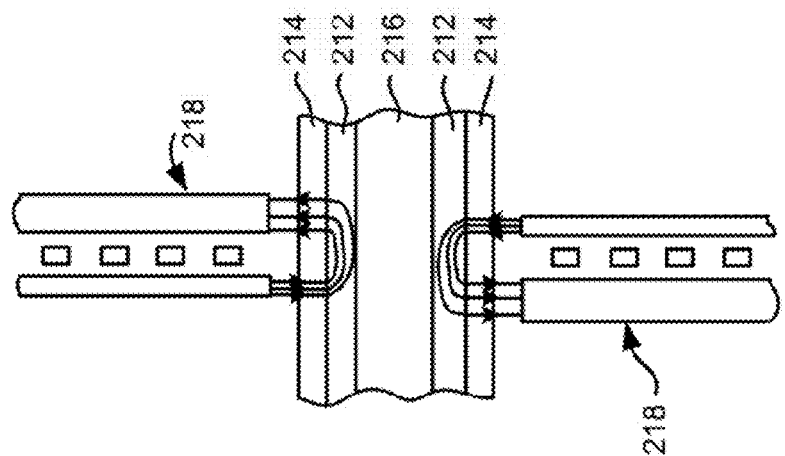
FIG. 2A is a schematic representation in section of a recording medium utilizing a longitudinal recording format.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

Figure 2B:
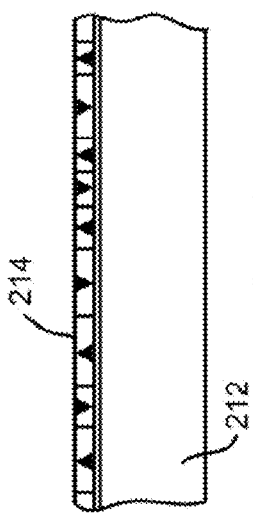
FIG. 2B is a schematic representation of a conventional magnetic recording head and recording medium combination for longitudinal recording as in FIG. 2A.

FIG. 2B shows the operative relationship between a conventional recording/playback head 204, which may preferably be a thin film head, and a conventional recording medium, such as that of FIG. 2A.

Figure 2C:
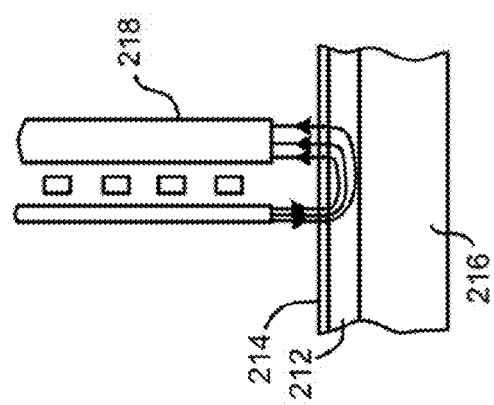
FIG. 2C is a magnetic recording medium utilizing a perpendicular recording format.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

Figure 2D:
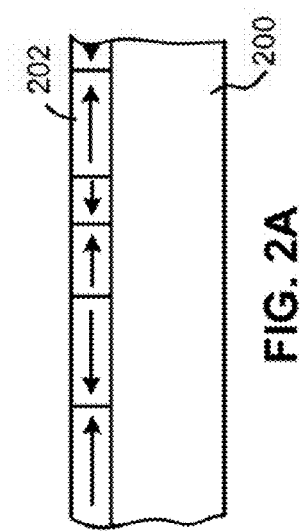
FIG. 2D is a schematic representation of a recording head and recording medium combination for perpendicular recording on one side.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (Pl) of the head 218.

Figure 2E:
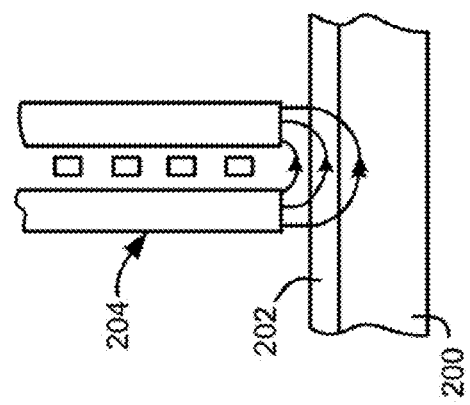
FIG. 2E is a schematic representation of a recording apparatus adapted for recording separately on both sides of the medium.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

Except as otherwise described herein, the various components of the structures of FIGS. 3A-4B may be of conventional materials and design, as would be understood by one skilled in the art.

As previously mentioned, conventional writers must have their stitch poles positioned far away from the ABS to prevent leakage of flux while writing to a magnetic medium, thereby resulting in weaker write fields, longer delays, and decreased efficiency of the head. In sharp contrast, various approaches described and/or suggested herein preferably include a magnetic head having a tapered stitch pole which improves efficiency of the head. The tapered stitch pole preferably allows for a reduction in the distance between the stitch pole and the ABS without causing flux leakage, thereby improving head functionality.

Figure 5A:
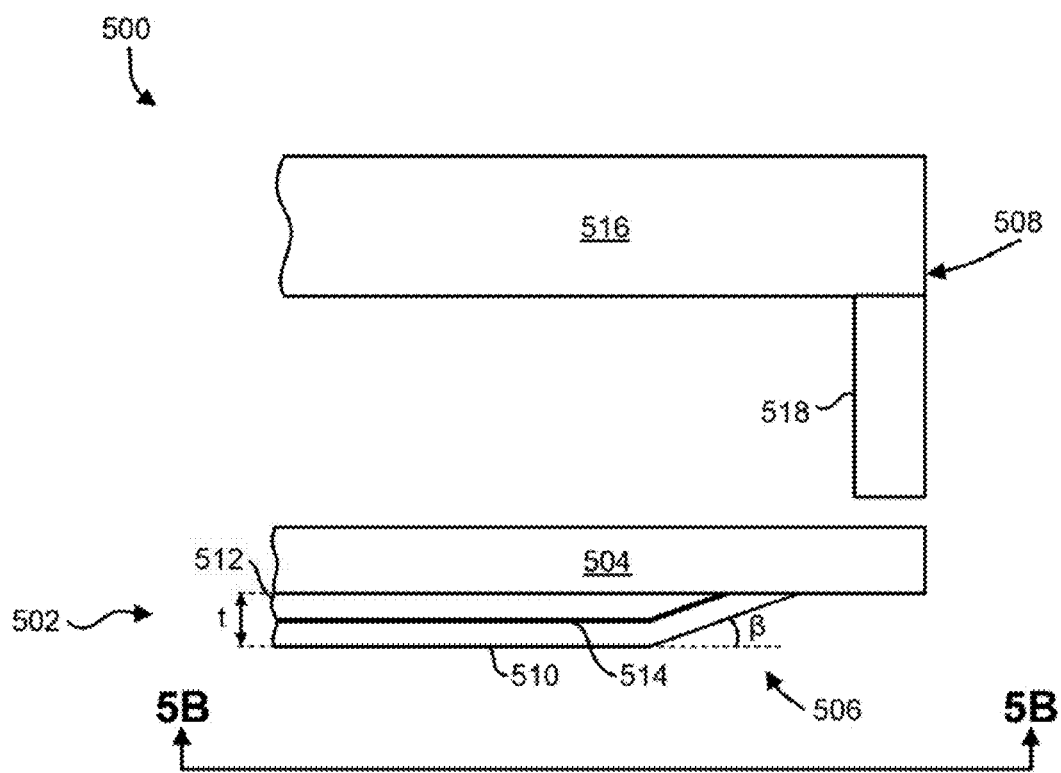
FIG. 5A is a partial cross sectional view of a magnetic head according to one embodiment.
Figure 5B:
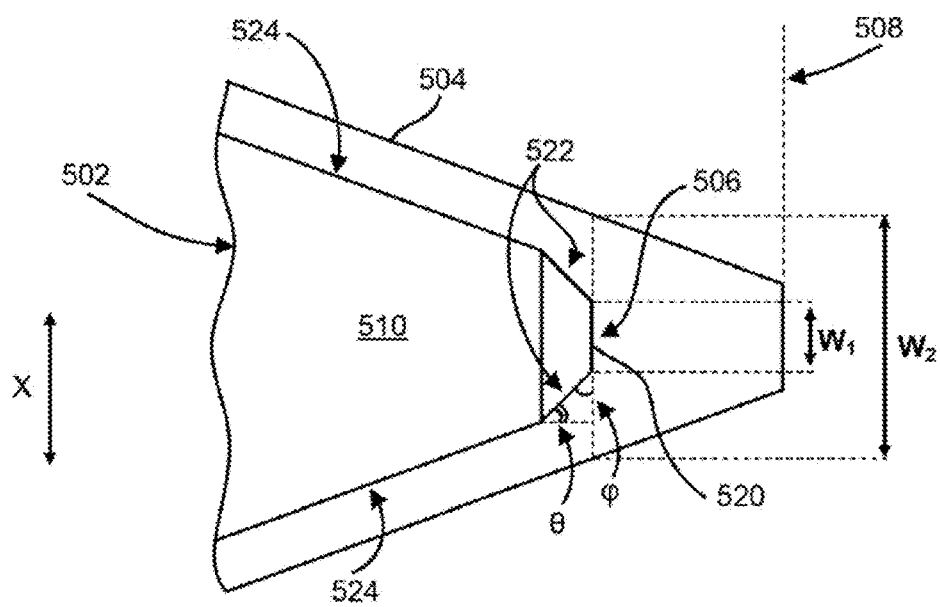
FIG. 5B is a partial side view of the magnetic head of FIG. 5A taken along Line 5B of FIG. 5A.

FIGS. 5A-5B depict a magnetic head 500 having improved writer efficiency, in accordance with one embodiment. As an option, the present magnetic head 500 may be implemented in conjunction with features from any other embodiment listed herein, such as those described with reference to the other FIGS. Of course, however, such magnetic head 500 and others presented herein may be used in various applications and/or in permutations which may or may not be specifically described in the illustrative embodiments listed herein. Further, the magnetic head 500 presented herein may be used in any desired environment.

Referring now to FIGS. 5A-5B, the magnetic head 500 has an upper return pole 516 and trailing shield 518, e.g., see also 302, 402 and 304, 404 of FIGS. 3A-3B and 4A-4B respectively.

Moreover, the magnetic head 500 also includes a stitch pole 502 and a main pole 504 formed adjacent to the stitch pole 502 as illustrated. According to various approaches, the stitch pole 502 and/or main pole 504 may be constructed of conventional materials, such as CoFe, NiFe, etc. However, according to other approaches, the stitch pole 502 and/or main pole 504 may have similar or the same material construction, methods of forming, etc. as the variations described above with reference to stitch poles 308, 408 and main poles 306, 406 respectively.

As shown in FIG. 5A, the end region 506 of the stitch pole 502 closest to an air bearing surface 508 of the head 500 tapers towards the main pole 504, at an angle $\beta$. Depending on the desired approach, the average angle $\beta$ of the taper of the end region 506 of the stitch pole 502 may be between about 20° (degrees) and about 45° where "about" refers to ±10% of the stated value, but may be higher or lower. Through testing of various illustrative embodiments, the inventors have discovered that implementing such a tapered angle $\beta$ can desirably increase the efficiency of magnetic head operations, as will be discussed in further detail below with reference to the description of FIGS. 6A-7.

Referring again to FIGS. 5A-5B, the stitch pole 502 may be a single layer, though various embodiments may include stitch poles having multiple layers, e.g., at least two, at least three, at least 5, multiple, etc. layers. However, in preferred approaches the stitch poles may have from two to four laminated layers. Thus, according to a preferred approach, the stitch pole 502 may be a laminate of at least two magnetic layers 510, 512. Furthermore, adjacent pairs of the potentially multiple magnetic layers of the stitch pole 502 may be separated by a nonmagnetic layer 514, including, but not limited to alumina, copper, tantalum, etc. The nonmagnetic layer 514 may be nonconductive. For example, the two magnetic layers 510, 512 of the embodiment illustrated in FIG. 5A are separated by a nonmagnetic layer 514. In various approaches, each of the magnetic layers and/or nonmagnetic layers of the stitch pole may be the same, similar and/or different than others therein.

In yet other approaches, no nonmagnetic layer may be present between at least some of the adjacent pairs of the magnetic layers.

A multi-layer stitch pole, e.g., as shown in FIG. 5A, may have a thickness t measured in a direction parallel to the ABS

508 from about 0.2 μm to about 0.5 μm, but could be higher or lower depending on the desired embodiment. Moreover, stitch poles having a different number of layers may have a thickness higher or lower than this range, depending on materials used, number of magnetic layers, number of nonmagnetic layers, desired magnetic characteristics, etc.

Moreover, although the stitch pole 502 of FIGS. 5A-5B is shown having two magnetic layers 510, 512, the ends of the laminated layers are both in direct magnetic contact with the main pole 504, i.e., there is no layer of nonmagnetic material between the ends of the laminated layers and the main pole. According to other approaches, there may be an intervening layer between at least one of the ends of the stitch pole layers and the main pole. Where the intervening layer is magnetic, a direct magnetic connection is present between the stitch pole 502 and the main pole 504. Where the intervening layer is nonmagnetic, an indirect magnetic connection may be present between the stitch pole 502 and the main pole 504. Moreover, at least some of the layers of a stitch pole may be in direct contact with the main pole, while one or more other layers may have an intervening layer therebetween.

As mentioned above, the inventors have discovered that implementing a tapered end region 506 of the stitch pole 502 enables a large increase in the efficiency of magnetic head operations. Looking to FIGS. 6A-6B, the graphs 600, 650 illustrate the effect that different angles for the tapered end region 506 have on the wrap angle shield (WAS) corner field, and efficiency improvement percentage of the magnetic head, respectively.

Figure 6A:
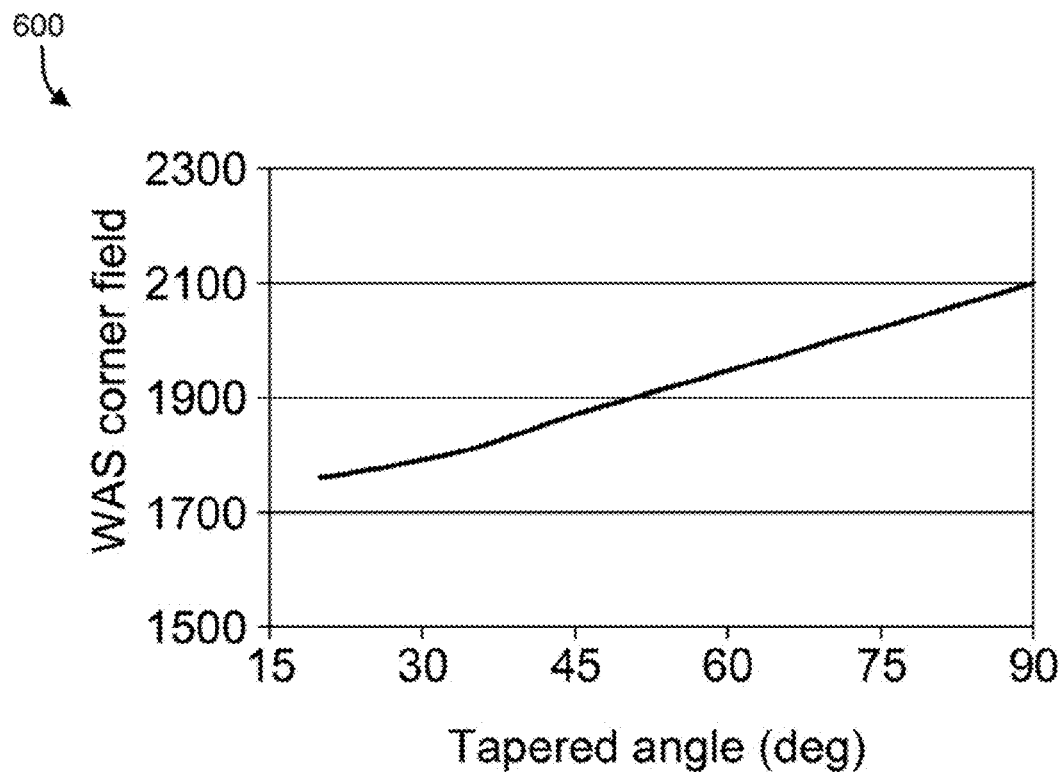
FIG. 6A is a graph of the wrap angle shield corner field relative to the stitch pole taper angle according to one embodiment.
Figure 6B:
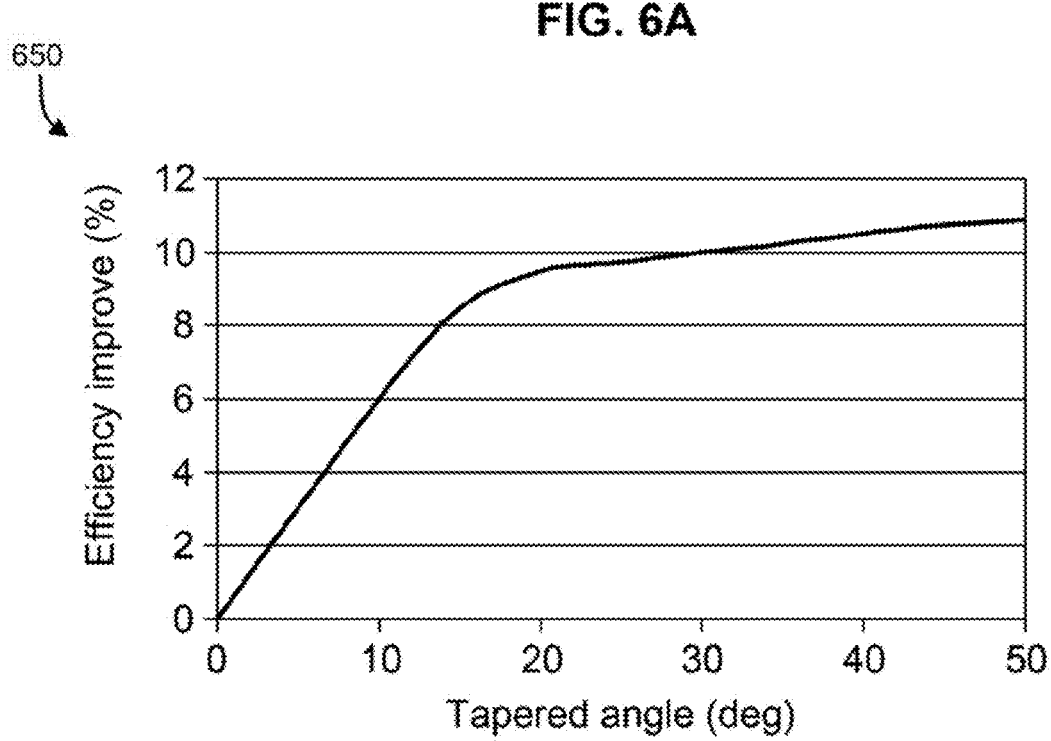
FIG. 6B is a graph of the efficiency improvement relative to the stitch pole taper angle according to one embodiment.

The graph 600 of FIG. 6A shows that the steeper (larger) the tapered angle for the stitch pole (e.g., the closer to being parallel to the ABS), the higher the WAS corner field. Increases to the WAS corner field raise the likelihood of having flux leak from the stitch pole, thereby potentially overwriting adjacent tracks on a medium at the ABS. Thus, the WAS corner field is preferably kept to a minimum value. However, looking now to FIG. 6B, the graph 650 illustrates the efficiency improvement increasing as the tapered angle increases. Thus, by balancing the propensity of flux leakage, with the efficiency improvement percentage, the inventors were able to ascertain that the desired range for the angle β of the tapered end region 506 of the stitch pole 502 is from about 20° to about 45°. Thus, the inventors were able to improve the output of a magnetic head having a stitch pole with a tapered end region.

Figure 7:
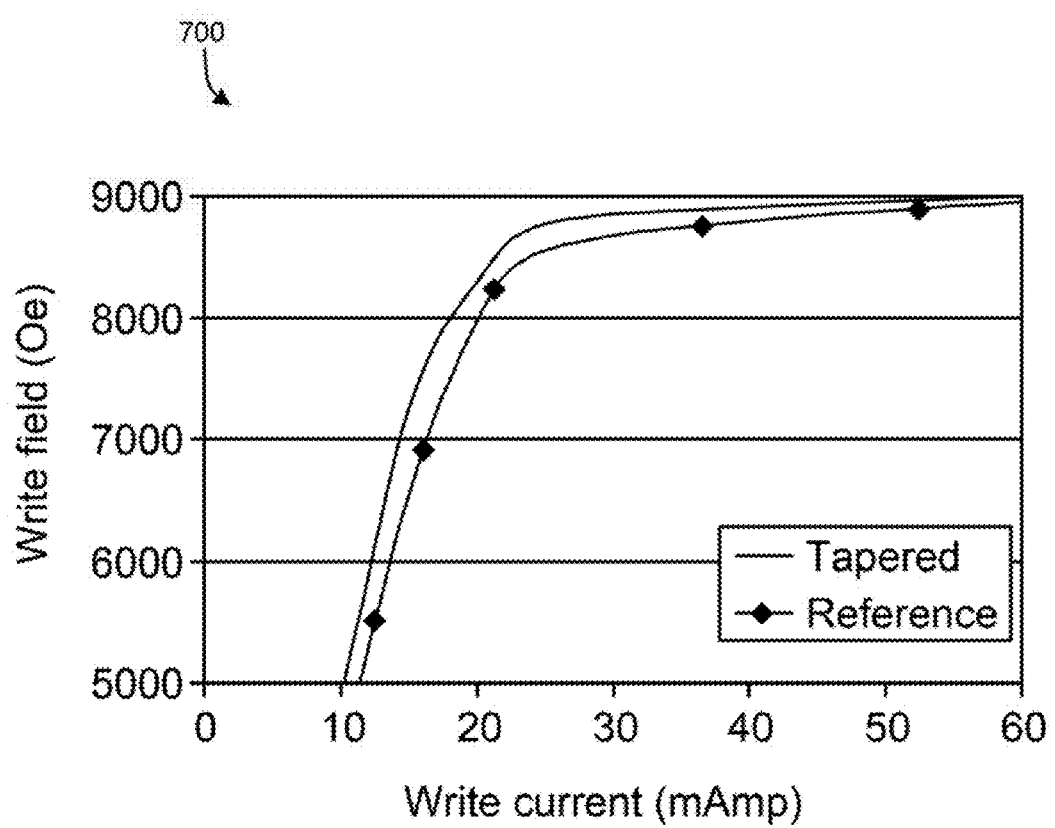
FIG. 7 is a graph of the write field relative to the write current of two head designs

Looking to FIG. 7, the graph 700 illustrates the saturation curve for a magnetic head having a stitch pole with a tapered end portion. As depicted in the graph 700, the write performance of the head having a tapered stitch pole (Tapered) experienced a 10% increase in writer efficiency over an otherwise identical reference head (Reference) without the novel features discussed herein, particularly, the tapered end portion.

The inventors have found that the tapered stitch pole allows the main pole of the magnetic head to be spaced about 0.3 μm to about 1.3 μm away from the ABS, which is much closer than achievable with a magnetic head without said tapered stitch pole. As a result, the performance and efficiency of the magnetic head are improved without experiencing the aforementioned issue of flux leakage and overwriting of data. Additionally, the reduced spacing between the tapered stitch pole and the ABS reduces the time lag from when a write current is initiated in the magnetic head, to when the head actually begins to write, thereby desirably lowering wait time and operating costs.

Referring back now to FIG. 5B, the end region 506 of the stitch pole 502 is shown as having a faceted end according to one preferred approach. As illustrated in FIG. 5B, the faceted end may be characterized by several relatively straight edges extending along the intersection of the periphery of the stitch pole 502 with the main pole 504 and meeting each other at predefined angles. According to various approaches, the angles may be predefined by a user, industry standards, calculated values, etc. prior to formation of the magnetic head 500, depending on the desired configuration.

With continued reference to FIG. 5B, a first edge 520 of the faceted end closest to the air bearing surface 508 is preferably aligned about parallel with the air bearing surface 508. Furthermore, the faceted end preferably has second edges 522 extending from the first edge 520, and third edges 524 extending from the second edges 522. According to various approaches, the angle φ of each of the second edges 522 relative to a line extending along the first edge 520 may be between about 30° and about 45°. Moreover, according to other approaches, the angle θ of each of the second edges 522 relative to a reference line extending perpendicular to the ABS may be between about 45° and about 60°. However, depending on the desired embodiment, the angles φ, θ may be higher or lower than the aforementioned ranges.

According to another approach, the sides of the main pole 504 preferably taper towards each other in a cross track direction X as they approach the air bearing surface 508. Moreover, the sides of the stitch pole 502 extending along the sides of the main pole preferably also taper towards each other in the cross track direction X as they approach the ABS 508.

According to yet another approach, the width $W_1$ of the first edge 520 may be between about ¼ and about ½ a width $W_2$ of the main pole measured along a line extending along the first edge 520. Thus, according to a preferred approach, the sides of the stitch pole 502 may be recessed from the sides of the main pole 504 as illustrated in FIG. 5B.

This recessed shape of the stitch pole is preferred as it reduces the chance of having flux leak from the stitch pole to the return pole, thereby traveling through the magnetic media itself and potentially overwriting adjacent data tracks. Rather, the recessed stitch pole as shown in FIG. 5B allows for the flux from the stitch pole to be absorbed and focused by the tapered main pole. Thus, the aforementioned design allows for the magnetic head to be positioned even closer to the media when reading data therefrom and/or writing data thereto with higher precision.

Figure 8:
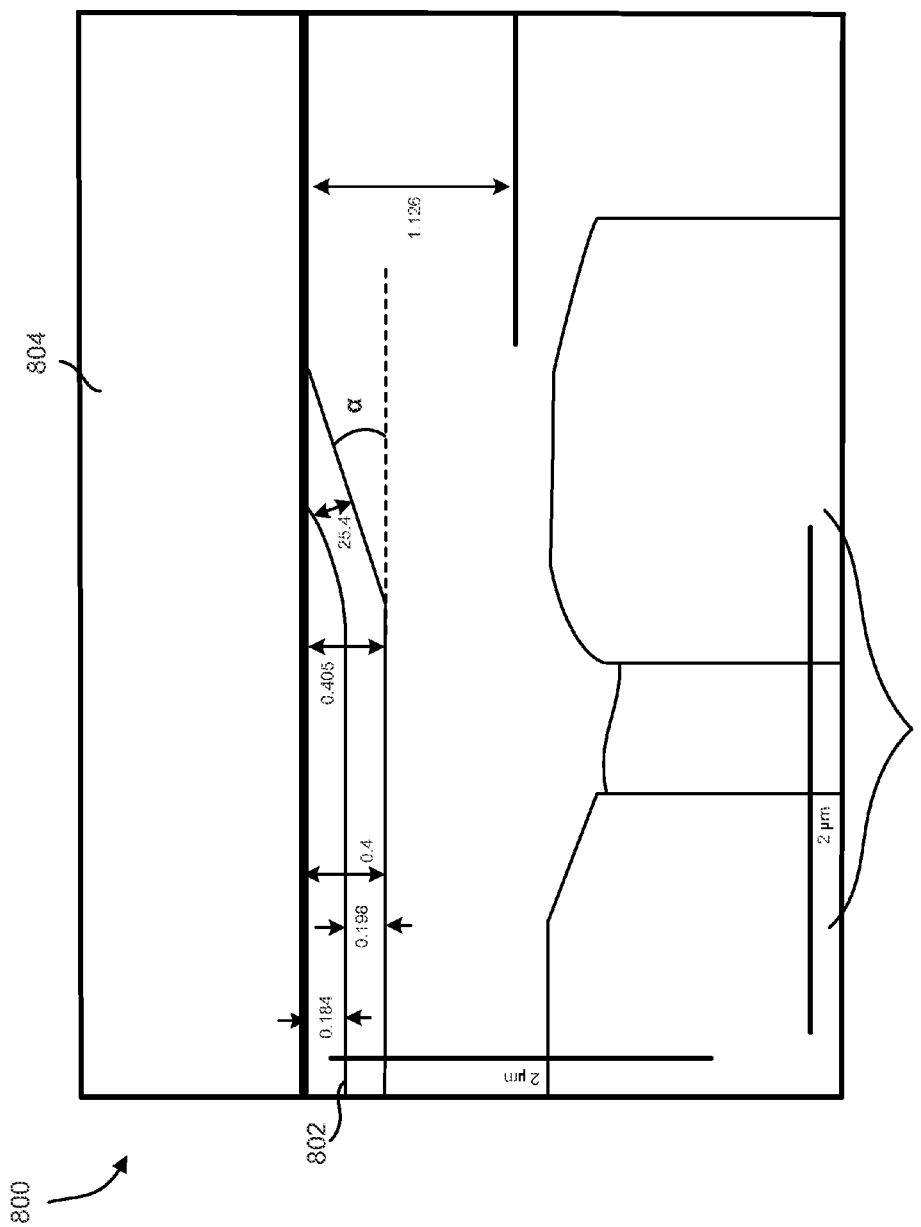
FIG. 8 is a partial side view of a magnetic head according to one embodiment.

FIG. 8 illustrates a partial side view of a magnetic head 800 having writer coils 808 below a main pole 804 and bilayer stitch pole 802 with a tapered end portion having an angle α taken along some point of the tapered end portion. As described above, the average angle α of the tapered stitch pole is preferably from about 20° to about 45°, but may be higher or lower depending on the desired embodiment. Moreover, the illustrative dimensions shown in FIG. 8 are in no way intended to limit the invention, but rather have been added to show the details of the exemplary embodiment depicted therein.

The various approaches described and/or suggested herein allow for an optimized efficiency and data density on a magnetic medium. Moreover, any of the designs and/or approaches described herein may be formed using processes which are known in the art, such as sputtering, plating, chemical vapor deposition, planarizing, etc.

It should be noted that methodology presented herein for at least some of the various embodiments may be implemented, in whole or in part, in computer hardware, software, by hand, using specialty equipment, etc. and combinations thereof.

Moreover, any of the structures and/or steps may be implemented using known materials and/or techniques, as would become apparent to one skilled in the art upon reading the present specification.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head, comprising:
a stitch pole; and
a main pole formed adjacent the stitch pole,
wherein an end region of the stitch pole closest to an air bearing surface of the head tapers towards the main pole;
wherein a tip of the end region of the stitch pole closest to the air bearing surface of the head is recessed from a tip of an end region of the main pole closest to the air bearing surface of the head.

2. The magnetic head as recited in claim 1, wherein an average angle of the taper of the end region of the stitch pole is between about 20 and about 45 degrees.

3. The magnetic head as recited in claim 1, wherein the stitch pole is a single layer.

4. The magnetic head as recited in claim 1, wherein the stitch pole is a laminate of at least two magnetic layers separated by a nonmagnetic layer.

5. The magnetic head as recited in claim 4, wherein the ends of the laminated layers are both in direct magnetic contact with the main pole.

6. The magnetic head as recited in claim 1, wherein the end region of the stitch pole has a faceted end, a first edge of the end closest to the air bearing surface being aligned about parallel with the air bearing surface.

7. The magnetic head as recited in claim 6, wherein the faceted end has second edges extending from the first edge, and third edges extending from the second edges, wherein an angle of each of the second edges relative to a line extending along the first edge is between about 30 and about 45 degrees, wherein an angle of each of the second edges relative to a line extending perpendicular to the ABS is between about 45 and about 60 degrees.

8. The magnetic head as recited in claim 6, wherein a width of the first edge is between ¼ and ½ a width of the main pole measured along a line extending along the first edge.

9. A magnetic head, comprising:
a stitch pole; and
a main pole formed adjacent the stitch pole,
wherein an end region of the stitch pole closest to an air bearing surface of the head tapers towards the main pole,
wherein sides of the main pole taper towards each other in a cross track direction as they approach the air bearing surface, wherein sides of the stitch pole extending along the sides of the main pole also taper towards each other in the cross track direction as they approach the air bearing surface.

10. The magnetic head as recited in claim 9, wherein the sides of the stitch pole are recessed from the sides of the main pole.

11. A magnetic data storage system, comprising:
at least one magnetic head as recited in claim 1;
a magnetic medium;
a drive mechanism for passing the magnetic medium over the at least one magnetic head; and
a controller electrically coupled to the at least one magnetic head for controlling operation of the at least one magnetic head.

12. A magnetic head, comprising:
a stitch pole being a laminate of at least two magnetic layers separated by a nonmagnetic layer; and
a main pole formed adjacent the stitch pole,
wherein an end region of the stitch pole closest to an air bearing surface of the head tapers towards the main pole,
wherein an average angle of the taper of the end region of the stitch pole is between about 20 and about 45 degrees.

13. The magnetic head as recited in claim 12, wherein the ends of the laminated layers are both in direct magnetic contact with the main pole.

14. The magnetic head as recited in claim 12, wherein the end region of the stitch pole has a faceted end, a first edge of the end closest to the air bearing surface being aligned about parallel with the air bearing surface.

15. The magnetic head as recited in claim 14, wherein the faceted end has second edges extending from the first edge, and third edges extending from the second edges, wherein an angle of each of the second edges relative to a line extending along the first edge is between about 30 and about 45 degrees, wherein an angle of each of the second edges relative to a line extending perpendicular to the ABS is between about 45 and about 60 degrees.

16. The magnetic head as recited in claim 14, wherein a width of the first edge is between ¼ and ½ a width of the main pole measured along a line extending along the first edge.

17. The magnetic head as recited in claim 12, wherein sides of the main pole taper towards each other in a cross track direction as they approach the air bearing surface, wherein sides of the stitch pole extending along the sides of the main pole also taper towards each other in the cross track direction as they approach the air bearing surface.

18. The magnetic head as recited in claim 17, wherein the sides of the stitch pole are recessed from the sides of the main pole.

19. A magnetic data storage system, comprising:
at least one magnetic head as recited in claim 12;
a magnetic medium;
a drive mechanism for passing the magnetic medium over the at least one magnetic head; and
a controller electrically coupled to the at least one magnetic head for controlling operation of the at least one magnetic head.

20. The magnetic head as recited in claim 12, wherein a tip of the end region of the stitch pole closest to a media facing surface of the head is recessed from a tip of an end region of the main pole closest to the media facing surface of the head.

* * * * *